(12) United States Patent
Tang et al.

(10) Patent No.: US 9,578,280 B2
(45) Date of Patent: Feb. 21, 2017

(54) PROGRESSIVE DISPLAYING TERMINAL AND VIDEO PLAYING METHOD AND IMAGE PROCESSING APPARATUS THEREOF

(71) Applicant: AutoChips Inc., Hefei (CN)

(72) Inventors: Jing Tang, Hefei (CN); Shiyuan Dong, Hefei (CN)

(73) Assignee: AUTOCHIPS INC., Hefei, Anhui Province (CN)

(*) Notice: Subject to any disclaimer, the term of this patent is extended or adjusted under 35 U.S.C. 154(b) by 0 days.

(21) Appl. No.: 14/983,513

(22) Filed: Dec. 29, 2015

(65) Prior Publication Data

US 2016/0191846 A1 Jun. 30, 2016

(30) Foreign Application Priority Data

Dec. 29, 2014 (CN) .......................... 2014 1 0849581

(51) Int. Cl.
*H04N 7/01* (2006.01)
*G09G 5/00* (2006.01)

(52) U.S. Cl.
CPC .............. *H04N 7/012* (2013.01); *G09G 5/003* (2013.01); *G09G 2310/0229* (2013.01); *H04N 7/0125* (2013.01)

(58) Field of Classification Search
CPC .... H04N 7/012; H04N 7/0122; H04N 7/0125; H04N 7/0127; G09G 5/003; G09G 2310/0229
USPC .......................... 348/441, 448, 458, 459, 581
IPC ............................................... H04N 7/01, 9/74
See application file for complete search history.

(56) References Cited

U.S. PATENT DOCUMENTS

2006/0146194 A1* 7/2006 Lee ........................... G06T 3/40
348/582

* cited by examiner

*Primary Examiner* — Sherrie Hsia
(74) *Attorney, Agent, or Firm* — Cheng-Ju Chiang

(57) ABSTRACT

A progressive displaying terminal and a video playing method and an image processing apparatus thereof are provided. The video playing method includes: extracting an odd field and an even field of each frame of an interlaced video, where the interlaced video has an initial resolution higher than a screen resolution of a progressive displaying terminal, and scaling the odd field and the even field of each frame respectively and then playing the odd field and the even field of each frame. In this way, the present disclosure eliminates the need of de-interlacing when playing an interlaced video on a progressive displaying terminal, so the hardware configuration requirements and the cost are reduced and a good picture quality is ensured during playing of the video.

19 Claims, 5 Drawing Sheets

S11
Extracting an odd field and an even field of each frame of an interlaced video, where the interlaced video has an initial resolution higher than a screen resolution of a progressive displaying terminal

↓

S12
Scaling the odd field and the even field of each frame respectively for playing

PROGRESSIVE DISPLAYING TERMINAL AND VIDEO PLAYING METHOD AND IMAGE PROCESSING APPARATUS THEREOF

RELATED APPLICATIONS

This application claims all benefits accruing under 35 U.S.C. §119 from China Patent Application No. 201410849581.6, filed on Dec. 29, 2014 in the China Intellectual Property Office, the contents of which are hereby incorporated by reference.

FIELD OF THE INVENTION

The present disclosure generally relates to the technical field of terminal displaying, and more particularly, to a progressive displaying terminal and a video playing method and an image processing apparatus thereof.

BACKGROUND OF THE INVENTION

Currently, when a progressive displaying terminal plays an interlaced video, generally a de-interlacing (DI) operation is required to make an improvement on or eliminate the "jaggies". However, the de-interlacing operation imposes high requirements on hardware configuration of the progressive displaying terminal, and particularly for high-definition interlaced videos having a resolution of 1920*1080 and displaying 25 frames per second, the processing burden in the interlaced processing is 1920*1080*25 per second, and such a huge processing burden imposes higher requirements on the hardware configuration. This leads to a high cost and makes it difficult to guarantee a good picture quality in video playing.

SUMMARY OF THE INVENTION

In view of the above, one objective of the present invention is to provide a progressive displaying terminal and a video playing method and an image processing apparatus thereof.

According to a first aspect of the present invention, an exemplary video playing method may comprise the following steps: extracting an odd field and an even field of each frame of an interlaced video having an initial resolution higher than a screen resolution of a progressive displaying terminal, and scaling the odd field and the even field of each frame respectively and then playing the scaled odd field and the scaled even field of each frame.

In one embodiment, the step of scaling the odd field and the even field of each frame respectively may further comprise the following steps: activating a memory having a width identical to a width corresponding to the screen resolution of the progressive displaying terminal and a height twice a height corresponding to the screen resolution of the progressive displaying terminal, scaling the odd field of each frame and then storing the scaled odd field into an odd row of the memory, and scaling the even field of each frame and then storing the scaled even field into an even row of the memory.

In one embodiment, the step of scaling the odd field and the even field of each frame respectively may further comprise the following steps: activating a memory having a width identical to a width corresponding to the screen resolution of the progressive displaying terminal and a height twice a height corresponding to the screen resolution of the progressive displaying terminal, scaling the odd field of each frame and then storing the scaled odd field into an upper portion or a lower portion of the memory, and scaling the even field of each frame and then storing the scaled even field into the lower portion or the upper portion of the memory correspondingly.

In one embodiment, the step of scaling the odd field and the even field of each frame respectively may further comprise the following steps: activating two memories, each of the memories having a width identical to a width corresponding to the screen resolution of the progressive displaying terminal and a height identical to a height corresponding to the screen resolution of the progressive displaying terminal, scaling the odd field of each frame and then storing the scaled odd field into one of the two memories, and scaling the even field of each frame and then storing the scaled even field into the other of the two memories In one embodiment, the step of scaling the odd field and the even field of each frame respectively may comprise the following step: scaling the odd field and the even field of each frame to a size equal to the screen resolution of the progressive displaying terminal respectively.

In one embodiment, the step of scaling the odd field and the even field of each frame respectively and then playing the scaled odd field and the scaled even field of each frame may further comprise the following step: retrieving the scaled odd field and the scaled even field from the memory in sequence according to a playing time sequence of corresponding odd field and corresponding even field in the interlaced video and sending the odd field and the even field to the screen of the progressive displaying terminal for displaying.

According to a second aspect of the present invention, an exemplary progressive displaying terminal may comprise: an extracting module configured to extract an odd field and an even field of each frame of an interlaced video, an image scaling module coupled with the extracting module and configured to scale the odd field and the even field of each frame respectively, and a displaying module coupled with the image scaling module and configured to play the scaled odd field and the scaled even field of each frame, wherein the interlaced video has an initial resolution higher than a screen resolution of the progressive displaying terminal.

In one embodiment, the displaying terminal may further comprise a storage module coupled with the image scaling module and the displaying module and configured to store the scaled odd field and the scaled even field of each frame.

In one embodiment, the storage module may comprise a memory having a width identical to a width corresponding to the screen resolution of the progressive displaying terminal and a height twice a height corresponding to the screen resolution of the progressive displaying terminal. An odd row of the memory may be configured to store the scaled odd field of each frame, and an even row of the memory may be configured to store the scaled even field of each frame.

In one embodiment, the storage module may comprise a memory having a width identical to a width corresponding to the screen resolution of the progressive displaying terminal and a height twice a height corresponding to the screen resolution of the progressive displaying terminal. An upper portion of the memory may be configured to store one of the scaled odd field and the scaled even field of each frame, and a lower portion of the memory may be configured to store the other of the scaled odd field and the scaled even field of each frame.

In one embodiment, the storage module may comprise two memories each having a width identical to a width corresponding to the screen resolution of the progressive displaying terminal and a height identical to a height corresponding to the screen resolution of the progressive displaying terminal. One of two memories may be configured to store the scaled odd field of each frame, and the other of the two memories may be configured to store the scaled even field of each frame.

In one embodiment, the image scaling module may be configured to scale the odd field and the even field of each frame to a size equal to the screen resolution of the progressive displaying terminal respectively.

In one embodiment, the displaying module may be configured to retrieve the odd field and the even field for displaying from the storage module in sequence according to a playing time sequence of corresponding odd field and corresponding even field in the interlaced video.

According to a third aspect of the present invention, an exemplary image processing apparatus may comprise: an extracting module configured to extract an odd field and an even field of each frame of an interlaced video, and an image scaling module coupled with the extracting module and configured to scale the odd field and the even field of each frame and then output the scaled odd field and the scaled even field of each frame to a displaying terminal for displaying, wherein the interlaced video has an initial resolution higher than a screen resolution of the displaying terminal.

In one embodiment, the image scaling module may further comprise a storage module configured to store the scaled odd field and the scaled even field of each frame.

In one embodiment, the storage module may comprise a memory having a width identical to a width corresponding to the screen resolution of the displaying terminal and a height twice a height corresponding to the screen resolution of the displaying terminal. An odd row of the memory may be configured to store the scaled odd field of each frame, and an even row of the memory may be configured to store the scaled even field of each frame.

In one embodiment, the storage module may comprise a memory having a width identical to a width corresponding to the screen resolution of the displaying terminal and a height twice a height corresponding to the screen resolution of the displaying terminal. An upper portion of the memory may be configured to store one of the scaled odd field and the scaled even field of each frame, and a lower portion of the memory may be configured to store the other of the scaled odd field and the scaled even field of each frame.

In one embodiment, the storage module may comprise two memories each having a width identical to a width corresponding to the screen resolution of the displaying terminal and a height identical to a height corresponding to the screen resolution of the progressive displaying terminal. One of two memories may be configured to store the scaled odd field of each frame, and the other of the two memories may be configured to store the scaled even field of each frame.

In one embodiment, the image scaling module may be configured to scale the odd field and the even field of each frame to a size equal to the screen resolution of the displaying terminal respectively.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Hereinbelow, technical solutions of embodiments of the present disclosure will be described clearly and completely with reference to the attached drawings. Obviously, embodiments described hereinbelow are only some of but not all of the embodiments of the present disclosure. All other embodiments that can be obtained without making any inventive efforts by those of ordinary skill in the art upon reviewing the embodiments of the present disclosure shall fall within the scope of the present disclosure.

Figure 1:
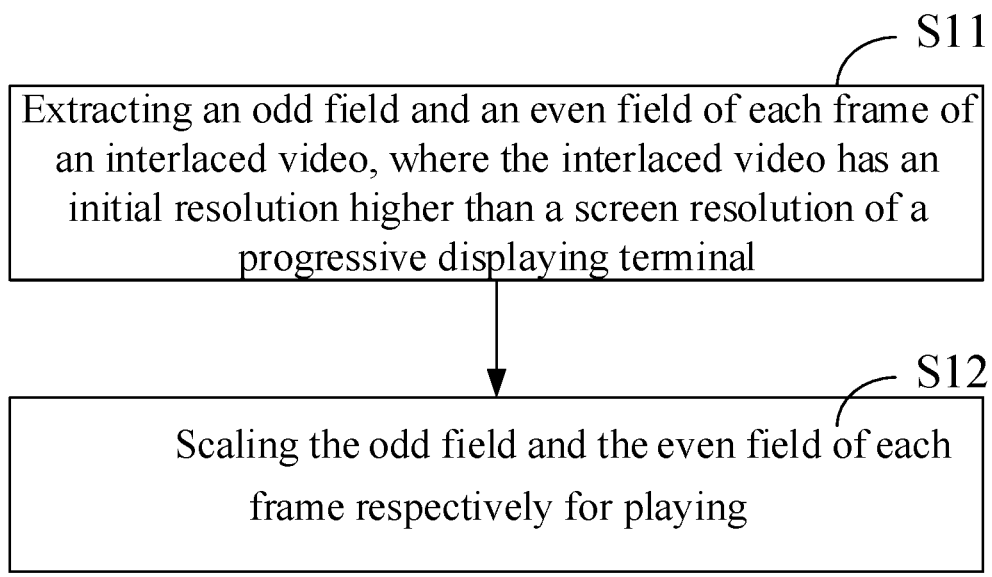
FIG. 1 is a flowchart diagram of a video playing method according to a first embodiment of the present disclosure.

FIG. 1 is a flowchart diagram of a video playing method according to a first embodiment of the present disclosure. As shown in FIG. 1, the video playing method of this embodiment comprises the following steps:

step S11: extracting an odd field and an even field of each frame of an interlaced video, wherein the interlaced video has an initial resolution higher than a screen resolution of a progressive displaying terminal.

Each frame of the interlaced video includes two images of the odd field and the even field having a size identical to each other. For example, for an interlaced video having a resolution of 1920*1080, the size of each frame thereof is 1920*1080, accordingly, the size of the odd field of each frame is 1920*540, and the size of the even field of each frame is also 1920*540.

Step S12: scaling the odd field and the even field of each frame respectively and then playing the odd field and the even field of the each frame.

In the step S12, taking a high-definition interlaced video having a resolution of 1920*1080 as an example, the size of each field is 1920*540. The odd field and the even field of each frame can be directly scaled to a size equal to the screen resolution of the progressive displaying terminal respectively depending on actual demand. For example, if a high-definition interlaced video having a resolution of 1920*1080 is played on a progressive displaying terminal having a screen resolution of 1024*600, and the size of the odd field and the even field of each frame is 1920*540, the odd field and the even field of the each frame may be directly scaled to a size of 1024*600. Then the scaled odd field and the scaled even field having a size of 1024*600 are sent in sequence to the screen of the progressive displaying terminal for displaying according to a playing time sequence of corresponding odd field and corresponding even field in the interlaced video.

As can be known from the above description, this embodiment plays the interlaced video directly after scaling the odd field and even field of each frame of the interlaced video, thus leading to a good picture quality. Therefore, the need of de-interlacing could be avoided in this embodiment, and the hardware configuration requirements and the cost could be reduced. The scaling operation may be, for example, the bilinear interpolation operation, the 4-tap scaling operation or the 6-tap scaling operation or other such scaling operations, and the way the scaling is carried out will be known by those skilled in the art and, thus, will not be further detailed herein.

As can be known from the above description, this embodiment scales the extracted odd field and the extracted even field of each frame of the interlaced video to a size equal to the screen resolution of the progressive displaying terminal respectively, and then directly play the data of each scaled field. Because the resolution of the data of each field is equal to the screen resolution, the data of each field, when being played, may be directly considered as a frame. Because the data each time played on the screen belongs to a same odd field or a same even field, the "jaggies" will not occur during playing, and the picture quality is good. Thereby, the need of de-interlacing could be avoided in this embodiment, and the hardware configuration requirements and the cost could be reduced.

The resolution illustrated in the present specification is only for purpose of illustration, rather than to limit the present disclosure. For example, the common screen resolutions are 800×480, 1024×600 or 1280×800 and etc.; and according to the disclosures of the present specification, how to implement the video playing method of the present disclosure when the screen resolution is some other value will be known by those skilled in the art.

Figure 2:
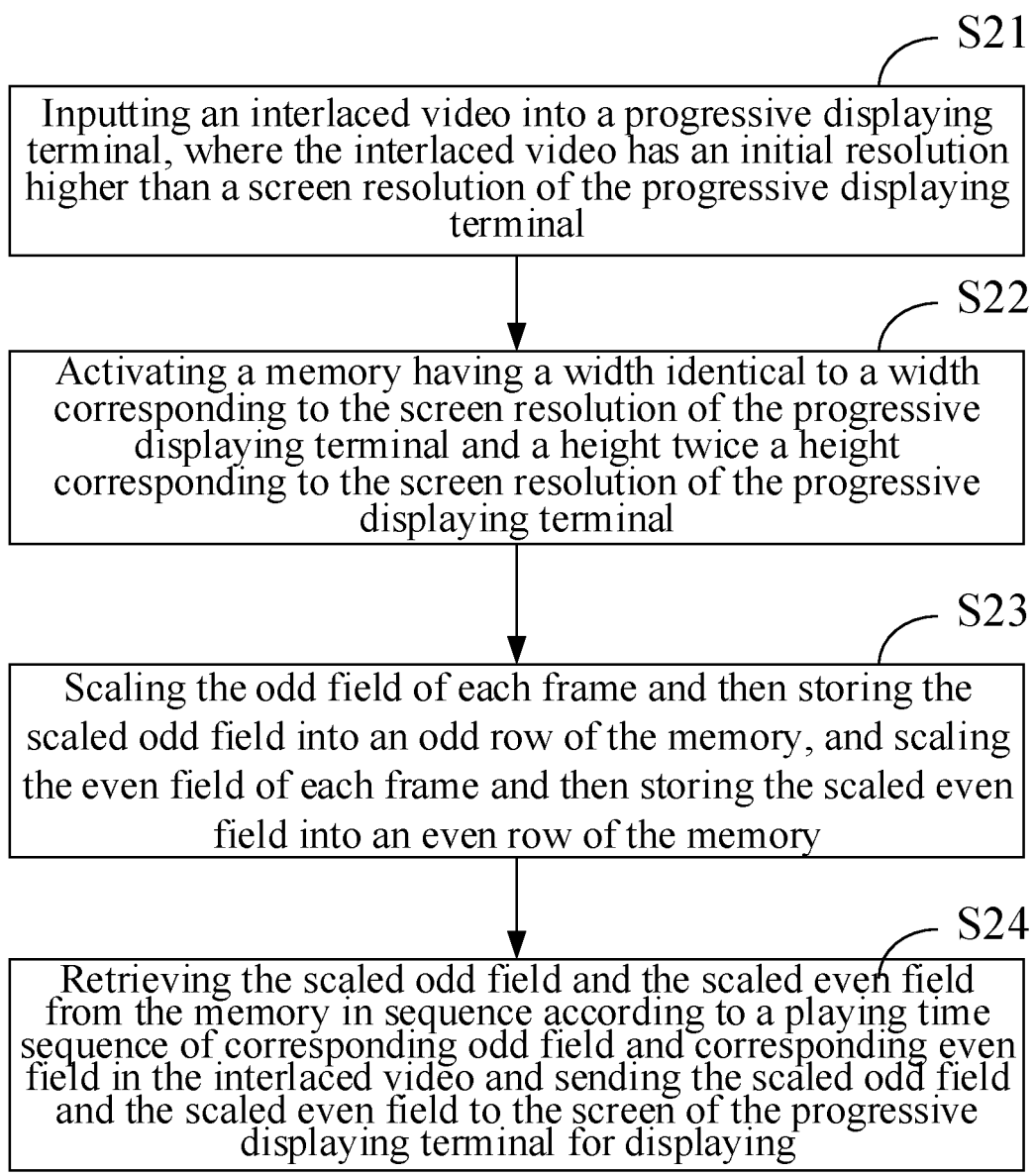
FIG. 2 is a flowchart diagram of a video playing method according to a second embodiment of the present disclosure.

Based on the descriptions of the embodiment described above, a video playing method according to an embodiment as shown in FIG. 2 is provided to illustrate the scaling process in detail.

As shown in FIG. 2, the video playing method of this embodiment comprises the following steps:

step S21: inputting an interlaced video into a progressive displaying terminal, wherein the interlaced video has an initial resolution higher than a screen resolution of the progressive displaying terminal;

step S22: activating a memory, which has a width identical to a width corresponding to the screen resolution of the progressive displaying terminal, and a height twice a height corresponding to the screen resolution of the progressive displaying terminal;

step S23: scaling the odd field of each frame and then storing the scaled odd field into an odd row of the memory, and scaling the even field of each frame and then storing the scaled even field into an even row of the memory; and step S24: retrieving the scaled odd field and the scaled even field from the memory in sequence according to a playing time sequence of the corresponding odd field and the corresponding even field in the interlaced video and sending the scaled odd field and the scaled even field to the screen of the progressive displaying terminal for displaying.

In this embodiment, the size of the activated memory is the greatest resolution of images of odd fields and even fields that can be stored. Taking an interlaced video having an initial resolution of 1920*1080 as an example, the sizes of the odd field and the even field are both 1920*540 after each frame of the interlaced video is decoded by a video decoding unit of the progressive displaying terminal, and if the screen resolution of the progressive displaying terminal is 1024*600, then the activated memory has a width of 1024 and a height of 1200.

An odd field having a size of 1920*540 is retrieved from each frame and scaled to a scaled odd field having a size of 1024*600, and then the scaled odd field having the size of 1024*600 is further stored into the memory having a size of 1024*1200. Likewise, an even field having a size of 1920*540 is retrieved from each frame and scaled to a scaled even field having a size of 1024*600, and then the scaled even field having the size of 1024*600 is further stored into the memory having a size of 1024*1200.

Figure 3:
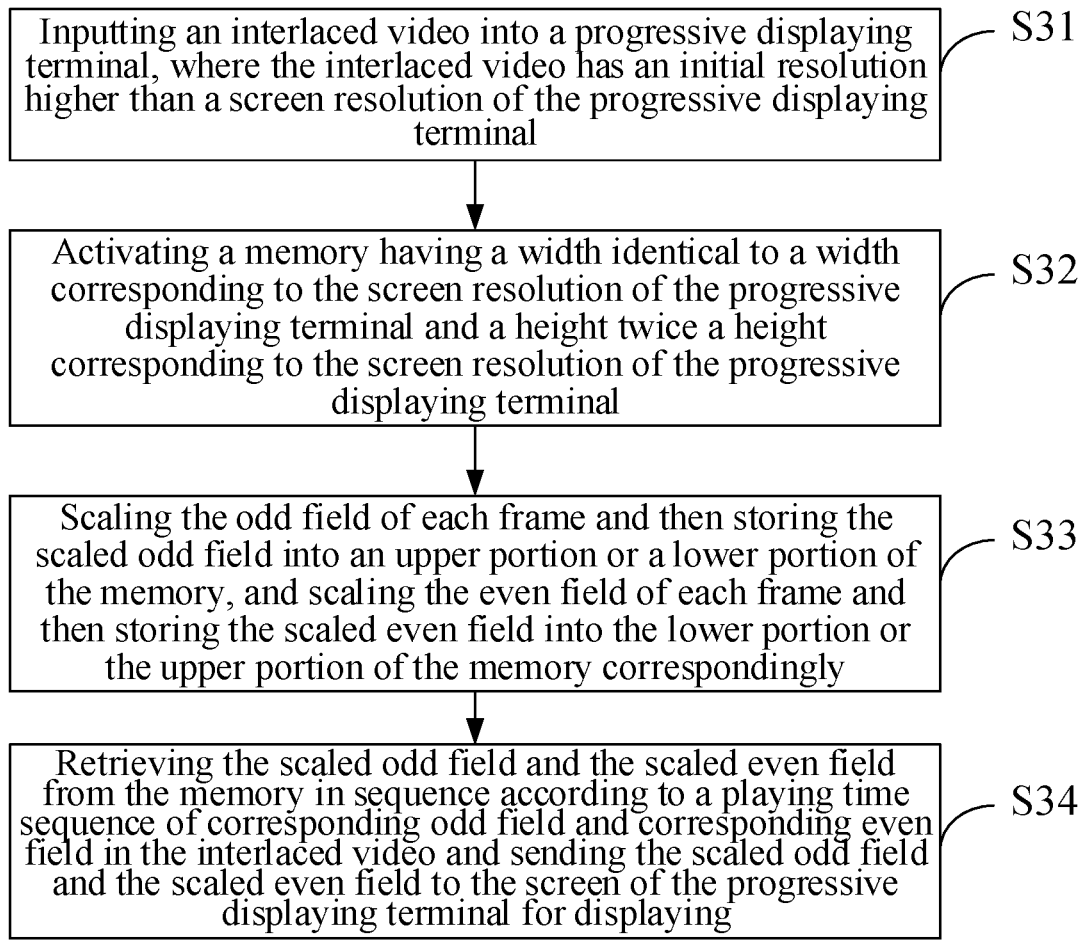
FIG. 3 is a flowchart diagram of a video playing method according to a third embodiment of the present disclosure.

FIG. 3 illustrates a flowchart diagram of a video playing method according to a third embodiment of the present disclosure. This embodiment differs from the embodiment shown in FIG. 2 in the storage positions of the scaled odd field and the scaled even field in the memory. As shown in FIG. 3, the video playing method of this embodiment comprises the following steps:

step S31: inputting an interlaced video into a progressive displaying terminal, wherein the interlaced video has an initial resolution higher than a screen resolution of the progressive displaying terminal;

step S32: activating a memory, which has a width identical to a width corresponding to the screen resolution of the progressive displaying terminal and a height twice a height corresponding to the screen resolution of the progressive displaying terminal;

step S33: scaling the odd field of each frame and then storing the scaled odd field into an upper portion or a lower portion of the memory, and scaling the even field of each frame and then storing the scaled even field into the lower portion or the upper portion of the memory correspondingly; and step S34: retrieving the scaled odd field and the scaled even field from the memory in sequence according to a playing time sequence of the corresponding odd field and the corresponding even field in the interlaced video and sending the scaled odd field and the scaled even field to the screen of the progressive displaying terminal for displaying.

Figure 4:
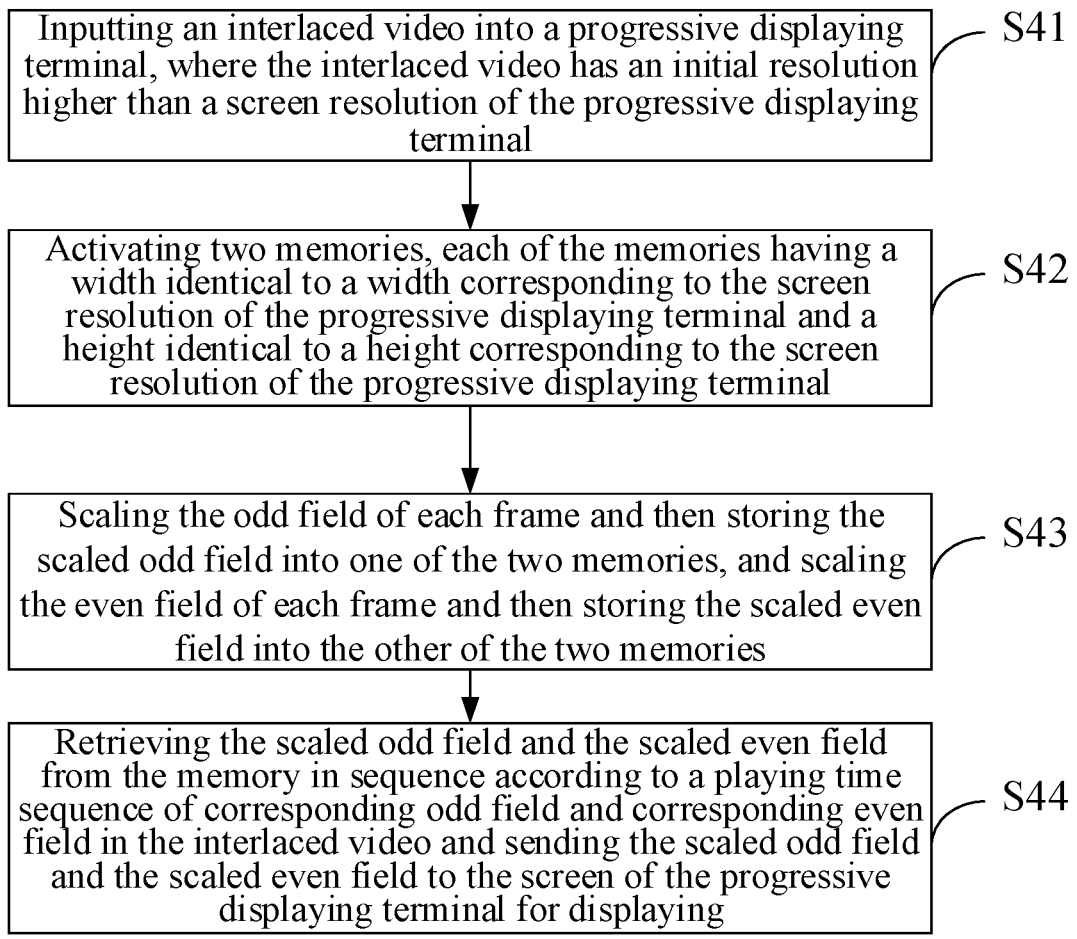
FIG. 4 is a flowchart diagram of a video playing method according to a fourth embodiment of the present disclosure.

FIG. 4 illustrates a flowchart diagram of a video playing method according to a fourth embodiment of the present disclosure. This embodiment differs from the embodiments shown in FIG. 2 and FIG. 3 in that this embodiment activates two memories.

As shown in FIG. 4, the video playing method of this embodiment comprises the following steps:

step S41: inputting an interlaced video into a progressive displaying terminal, wherein the interlaced video has an initial resolution higher than a screen resolution of a progressive displaying terminal;

step S42: activating two memories, each of the two memories having a width identical to a width corresponding to the screen resolution of the progressive displaying terminal and a height identical to a height corresponding to the screen resolution of the progressive displaying terminal;

step S43: scaling the odd field of each frame and then storing the scaled odd field into one of the two memories, and scaling the even field of each frame and then storing the scaled even field into the other of the two memories; and step S44: retrieving the scaled odd field and the even field from the memory in sequence according to a playing time sequence of the corresponding odd field and the corresponding even field in the interlaced video and sending the scaled odd field and the scaled even field to the screen of the progressive displaying terminal for displaying.

Taking an interlaced video having a resolution of 1920*1080 as an example, the sizes of the odd field and the even field of each frame after being decoded are both 1920*540, and if the screen resolution of the progressive displaying terminal is 1024*600, then the two memories have a width of 1024 and a height of 600.

Figure 5:
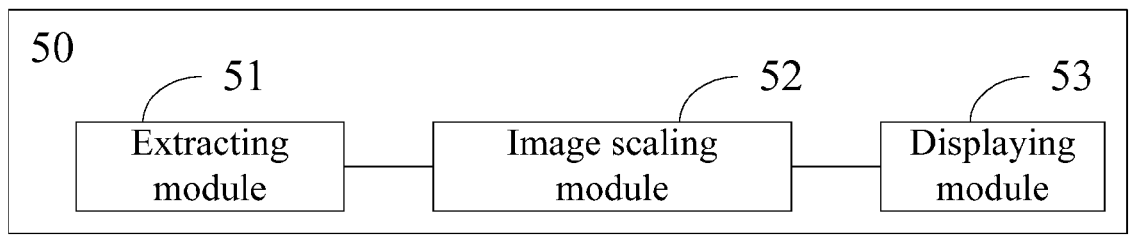
FIG. 5 is a block diagram illustrating principles of a progressive displaying terminal according to a preferred embodiment of the present disclosure.

FIG. 5 is a block diagram illustrating a progressive displaying terminal 50 according to a preferred embodiment of the present disclosure. As shown in FIG. 5, the progressive displaying terminal 50 of this embodiment comprises an extracting module 51, an image scaling module 52 and a displaying module 53. The image scaling module 52 is coupled with the extracting module 51, and the displaying module 53 is coupled with the image scaling module 52. Specifically, the extracting module 51 and image scaling module 52 can be implemented by a processor, and the displaying module 53 can be implemented by a displayer.

The extracting module 51 is configured to extract an odd field and an even field from each frame of an interlaced video, and the interlaced video has an initial resolution higher than a screen resolution of the progressive displaying terminal 50. The image scaling module 52 is configured to scale the odd field and the even field of each frame respectively. The displaying module 53 is configured to play the scaled odd field and the scaled even field of each frame, and specifically, the displaying module 53 retrieves the scaled odd field and the scaled even field for displaying from the memory in sequence according to a playing time sequence of the corresponding odd field and the corresponding even field in the interlaced video.

During the scaling process, the image scaling module 52 may scale the odd field and the even field of each frame to a size equal to the screen resolution of the progressive displaying terminal 50 respectively. In respect of this, the progressive displaying terminal 50 may further comprise a storage module (not labeled in figures) coupled with the image scaling module 52. The storage module could comprise a memory. The memory has a width identical to a width corresponding to the screen resolution of the progressive displaying terminal 50 and a height twice a height corresponding to the screen resolution of the progressive displaying terminal 50. An odd row of the memory is configured to store the scaled odd field of the each frame, and an even row of the memory is configured to store the scaled even field of the each frame.

Of course, depending on the different storage positions of the scaled odd field and the scaled even field in the memory, in an embodiment of the present disclosure, the storage may also be configured to comprise an upper portion for storing one of the scaled odd field and the scaled even field of each frame and a lower portion for storing the other of the scaled odd field and the scaled even field of each frame.

Further, the storage module may be further configured to comprise two memories. Each of the memories has a width identical to a width corresponding to the screen resolution of the progressive displaying terminal 50 and a height identical to a height corresponding to the screen resolution of the progressive displaying terminal 50. One of the two memories is configured to store the scaled odd field of the each frame, and the other of the two memories is configured to store the scaled even field of the each frame.

In this embodiment, the modules of the progressive displaying terminal 50 cooperate with each other to execute the video playing method of the embodiments shown in FIGS. 1~4 correspondingly, so the progressive displaying terminal 50 in this embodiment provides the same technical effects as the method embodiments described above.

Figure 6:
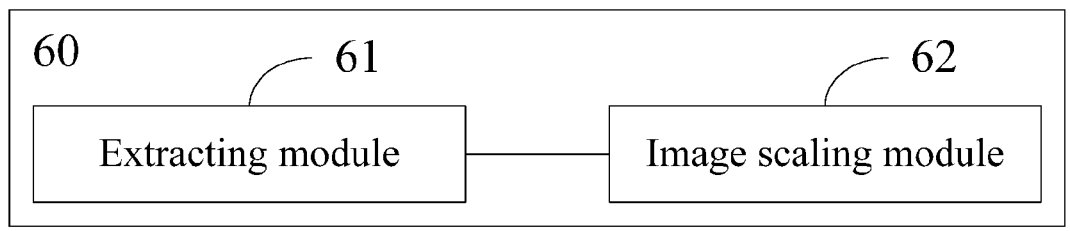
FIG. 6 is a block diagram illustrating principles of an image processing apparatus according to a preferred embodiment of the present disclosure.

The present disclosure further provides an image processing apparatus 60 as shown in FIG. 6. Referring to FIG. 6, the image processing apparatus 60 comprises an extracting module 61 and an image scaling module 62 coupled with the extracting module 61. The extracting module 61 is configured to extract an odd field and an even field of each frame of an interlaced video. The image scaling module 62 is configured to scale the odd field and the even field of each frame and then output the scaled odd field and scaled even field to a displaying terminal for displaying. The interlaced video has an initial resolution higher than a screen resolution of the displaying terminal.

In this embodiment, reference may be made to the extracting module 51 shown in FIG. 5 for the extracting process of the extracting module 61, and reference may be made to the image scaling module 52 shown in FIG. 5 for the scaling process of the image scaling module 62, so these will not be further detailed herein. In another embodiment, the extracting and the image scaling are performed by a same hardware, the extracting module 51 and the image scaling module 52 shown in FIG. 5 are implemented by a same hardware, and the extracting module 61 and the image scaling module 62 shown in FIG. 6 are implemented by a same hardware, and these will not be further detailed herein.

It shall be appreciated that, the implementations of the progressive displaying terminal 50 and the image processing apparatus 60 described above are only illustrative, and the described division of the modules is only a kind of division based on logical functions and other dividing manners are also possible in practical implementations. For example, several modules may be combined or integrated into another system, or some features may be ignored or will not be executed. Furthermore, the couplings between the modules may be achieved through some interfaces, or achieved electrically or in other forms.

It shall be noted again that, what described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A video playing method, comprising the following steps:
    extracting an odd field and an even field of each frame of an interlaced video, wherein the interlaced video has an initial resolution higher than a screen resolution of a progressive displaying terminal; and
    scaling the odd field and the even field of each frame respectively and then playing the scaled odd field and the scaled even field of each frame.

2. The video playing method of claim 1, wherein the step of scaling the odd field and the even field of each frame respectively further comprises the following steps:
    activating a memory, wherein the memory has a width identical to a width corresponding to the screen resolution of the progressive displaying terminal and a height twice a height corresponding to the screen resolution of the progressive displaying terminal; and
    scaling the odd field of each frame and then storing the scaled odd field into an odd row of the memory, and scaling the even field of each frame and then storing the scaled even field into an even row of the memory.

3. The video playing method of claim 1, wherein the step of scaling the odd field and the even field of each frame respectively further comprises the following steps of:
    activating a memory, wherein the memory has a width identical to a width corresponding to the screen resolution of the progressive displaying terminal and a height twice a height corresponding to the screen resolution of the progressive displaying terminal; and
    scaling the odd field of each frame and then storing the scaled odd field into an upper portion or a lower portion of the memory, and scaling the even field of each frame and then storing the scaled even field into the lower portion or the upper portion of the memory correspondingly.

4. The video playing method of claim 1, wherein the step of scaling the odd field and the even field of each frame respectively further comprises the following steps:
   activating two memories, wherein each of the memories has a width identical to a width corresponding to the screen resolution of the progressive displaying terminal and a height identical to a height corresponding to the screen resolution of the progressive displaying terminal; and
   scaling the odd field of each frame and then storing the scaled odd field into one of the two memories, and scaling the even field of each frame and then storing the scaled even field into the other of the two memories.

5. The video playing method of claim 1, wherein the step of scaling the odd field and the even field of each frame respectively comprises the following step:
   scaling the odd field and the even field of each frame to a size equal to the screen resolution of the progressive displaying terminal respectively.

6. The video playing method of claim 5, wherein the step of scaling the odd field and the even field of each frame respectively and then playing the scaled odd field and the scaled even field of each frame further comprises the following step:
   retrieving the scaled odd field and the scaled even field from a memory in sequence according to a playing time sequence of corresponding odd field and corresponding even field in the interlaced video and sending the scaled odd field and the scaled even field to the screen of the progressive displaying terminal for displaying.

7. A progressive displaying terminal, comprising:
   an extracting module configured to extract an odd field and an even field of each frame of an interlaced video;
   an image scaling module coupled with the extracting module, and configured to scale the odd field and the even field of each frame respectively; and
   a displaying module coupled with the image scaling module, and configured to play the scaled odd field and the scaled even field of each frame, wherein the interlaced video has an initial resolution higher than a screen resolution of a progressive displaying terminal.

8. The progressive displaying terminal of claim 7, wherein the displaying terminal further comprises:
   a storage module coupled with the image scaling module and the displaying module, configured to store the scaled odd field and the scaled even field of each frame.

9. The progressive displaying terminal of claim 8, wherein the storage module comprises a memory having a width identical to a width corresponding to the screen resolution of the progressive displaying terminal and a height twice a height corresponding to the screen resolution of the progressive displaying terminal, an odd row of the memory is configured to store the scaled odd field of each frame, and an even row of the memory is configured to store the scaled even field of each frame.

10. The progressive displaying terminal of claim 8, wherein the storage module comprises a memory, the memory has a width identical to a width corresponding to the screen resolution of the progressive displaying terminal and a height twice a height corresponding to the screen resolution of the progressive displaying terminal, wherein an upper portion of the memory is configured to store one of the scaled odd field and the scaled even field of each frame and a lower portion of the memory is configured to store the other of the scaled odd field and the scaled even field of each frame.

11. The progressive displaying terminal of claim 8, wherein the storage module comprises two memories each of the memories having a width identical to a width corresponding to the screen resolution of the progressive displaying terminal and a height identical to a height corresponding to the screen resolution of the progressive displaying terminal, wherein one of two memories is configured to store the scaled odd field of each frame and the other of the two memories is configured to store the scaled even field of each frame.

12. The progressive displaying terminal of claim 8, wherein the displaying module is configured to retrieve the scaled odd field and the scaled even field for displaying from the storage module in sequence according to a playing time sequence of corresponding odd field and corresponding even field in the interlaced video.

13. The progressive displaying terminal of claim 7, wherein the image scaling module is configured to scale the odd field and the even field of each frame to a size equal to the screen resolution of the progressive displaying terminal respectively.

14. An image processing apparatus, comprising:
   an extracting module, configured to extract an odd field and an even field of each frame of an interlaced video; and
   an image scaling module coupled with the extracting module and configured to scale the odd field and the even field of the each frame and then output the scaled odd field and the scaled even field of each frame to a displaying terminal for displaying, wherein the interlaced video has an initial resolution higher than a screen resolution of the displaying terminal.

15. The image processing apparatus of claim 14, wherein the image scaling module further comprises a storage module configured to store the scaled odd field and the scaled even field of each frame.

16. The image processing apparatus of claim 15, wherein the storage module comprises a memory having a width identical to a width corresponding to the screen resolution of the displaying terminal and a height twice a height corresponding to the screen resolution of the displaying terminal, wherein an odd row of the memory is configured to store the scaled odd field of each frame, and an even row of the memory is configured to store the scaled even field of each frame.

17. The image processing apparatus of claim 15, wherein the storage module comprises a memory, the memory has a width identical to a width corresponding to the screen resolution of the displaying terminal and a height twice a height corresponding to the screen resolution of the displaying terminal, wherein an upper portion of the memory is configured to store one of the scaled odd field and the scaled even field of each frame and a lower portion of the memory is configured to store the other of the scaled odd field and the scaled even field of each frame.

18. The image processing apparatus of claim 15, wherein the storage module comprises two memories each of the memories having a width identical to a width corresponding to the screen resolution of the displaying terminal and a height identical to a height corresponding to the screen resolution of the progressive displaying terminal, wherein one of two memories is configured to store the scaled odd field of each frame and the other of the two memories is configured to store the scaled even field of each frame.

19. The image processing apparatus of claim 14, wherein the image scaling module is configured to scale the odd field and the even field of each frame to a size equal to the screen resolution of the displaying terminal respectively.

* * * * *